Figure 1:
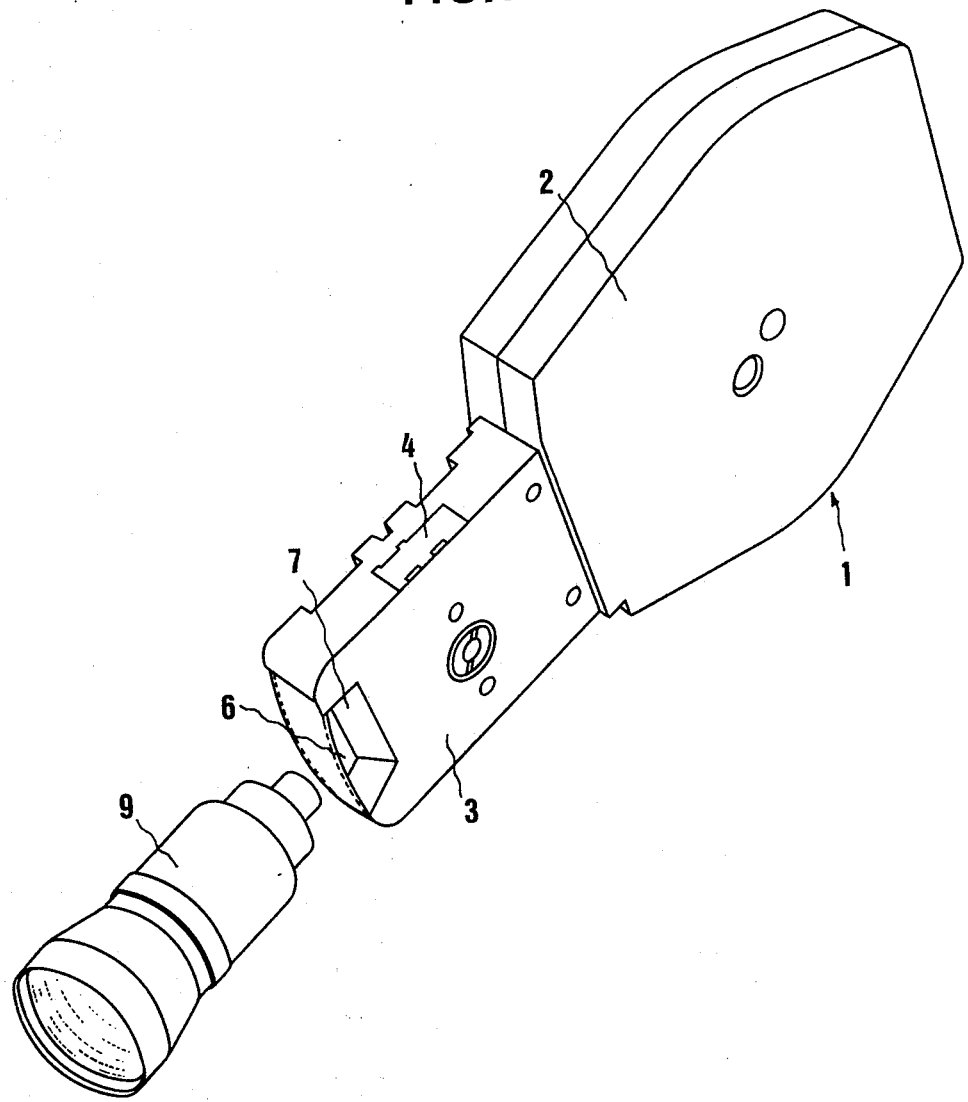

United States Patent [19]

Beaulieu

[11] 3,972,605
[45] Aug. 3, 1976

[54] CINECAMERA

[75] Inventor: Marcel Beaulieu, Langon Mennetou sur-Cher, France

[73] Assignee: Beaulieu S.A, Romorantin Lanthenay, France

[22] Filed: Apr. 14, 1975

[21] Appl. No.: 567,856

[30] Foreign Application Priority Data

May 24, 1974 France ............................. 74.18063

[52] U.S. Cl. ................................................. 352/72
[51] Int. Cl.² ....................................... G03B 23/02
[58] Field of Search ............................. 352/72, 221

[56] References Cited
UNITED STATES PATENTS 3,782,812  1/1974  Roller ................................... 352/72
3,807,841  4/1974  Dudley ................................. 352/72

*Primary Examiner*—Monroe H. Hayes

[57] ABSTRACT

The invention has for its object a cinecamera comprising an incorporated pressure pad and which is designed to use a loading clip of the type having a first gate with a pressure pad incorporated in the clip and a second film passage gate without an incorporated pressure pad.

Said camera comprises means for making the pressure pad incorporated in the loading clip inoperative and its incorporated pressure pad is arranged to co-operate with that portion of the film passing in front of the said second gate.

3 Claims, 5 Drawing Figures

CINECAMERA

The present invention relates to a cinecamera and more particularly to a camera using a large capacity loading clip.

The development of cameras for amateur photographers has largely been due to the availability of loading clips which can be used in a rapid and easy manner. This is particularly the case with so-called "Super 8" cameras. However, these loading clips have only a limited capacity.

They also have the disadvantage of a certain lack of precision in the positioning of the film during its passage in front of the gate, due to the inefficiency of the pressure pads incorporated in the clip and which are in fact nothing more than guides.

To obviate this lack of precision, loading clips are already being used which do not have an incorporated pressure pad and which can be used in cameras having a pressure pad. Although this solution solves the problems involved from a technical standpoint, it only has a limited use because most loading clips have a pressure pad incorporated therein.

Recently, a large capacity loading clip has been proposed which permits a sound recording simultaneously with a taking of shots. This elongated clip has a lateral gate for taking shots and a terminal gate for the sound recording. This new loading clip which is naturally of a relatively large size is positioned perpendicularly to the shooting axis and in fact a large part thereof projects above the camera. A shooting gate is equipped with a guide and not a real pressure pad so that this new loading clip suffers from the lack of precision of known clips.

The present invention aims at permitting the use of a loading clip of the type described hereinbefore in a new camera making it possible to obtain the high degree of shooting precision which is indispensable for cameras for professional or semi-professional use.

To this end, the invention has for its object a cinecamera comprising an incorporated pressure pad and which is designed to use a loading clip of the type having a first gate with a pressure guide incorporated in the clip and a second film passage gate without an incorporated pressure pad, wherein it comprises means for making the pressure guide incorporated in the loading clip inoperative and wherein its incorporated pressure pad is arranged to co-operate with that portion of the film passing in front of the said second gate.

By means of the camera according to the invention, this type of loading clip can be used with a pressure pad incorporated in the camera, through making inoperative, preferably automatically, the pressure pad incorporated in the loading clip.

According to one embodiment, the means for making the pressure pad incorporated in the loading clip inoperative comprise a shoe integral with a pivoting lever controlled from the outside of the camera. Preferably, the said pivoting lever is fixed to a second lever integral with the pressure pad incorporated in the camera, which makes it possible with a single operating member to render the pressure pad incorporated in the loading clip inoperative and place the pressure pad incorporated in the camera in the active position after fitting the clip on the camera.

The invention will be better understood from reading the following description with reference to the attached drawings wherein show:

FIG. 1 a perspective view of the loading clip in position relative to the camera lens.

Figure 2:
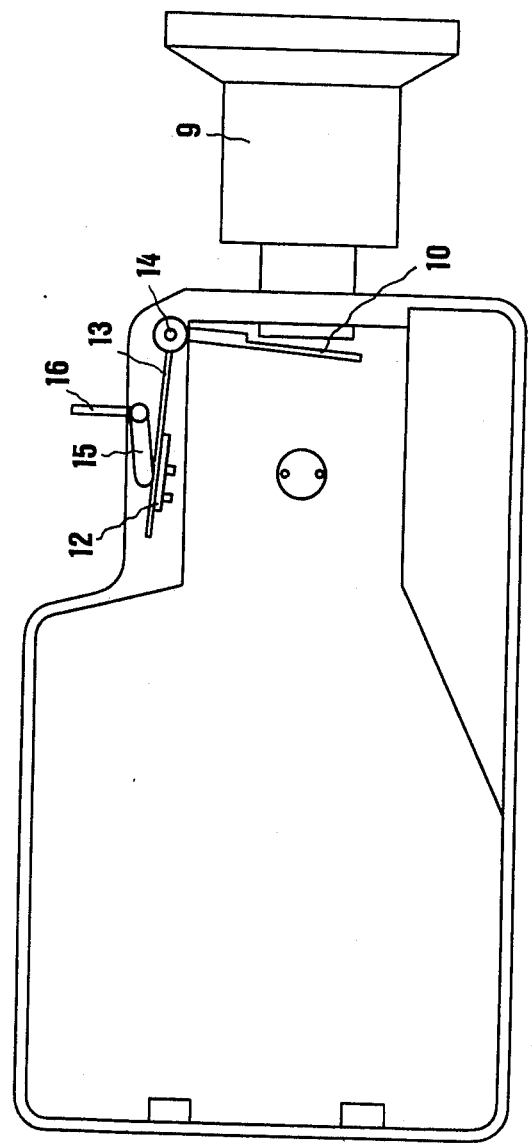

FIG. 2 a lateral elevation of a camera according to the invention in the open condition prior to introducing the loading clip.

Figure 3:
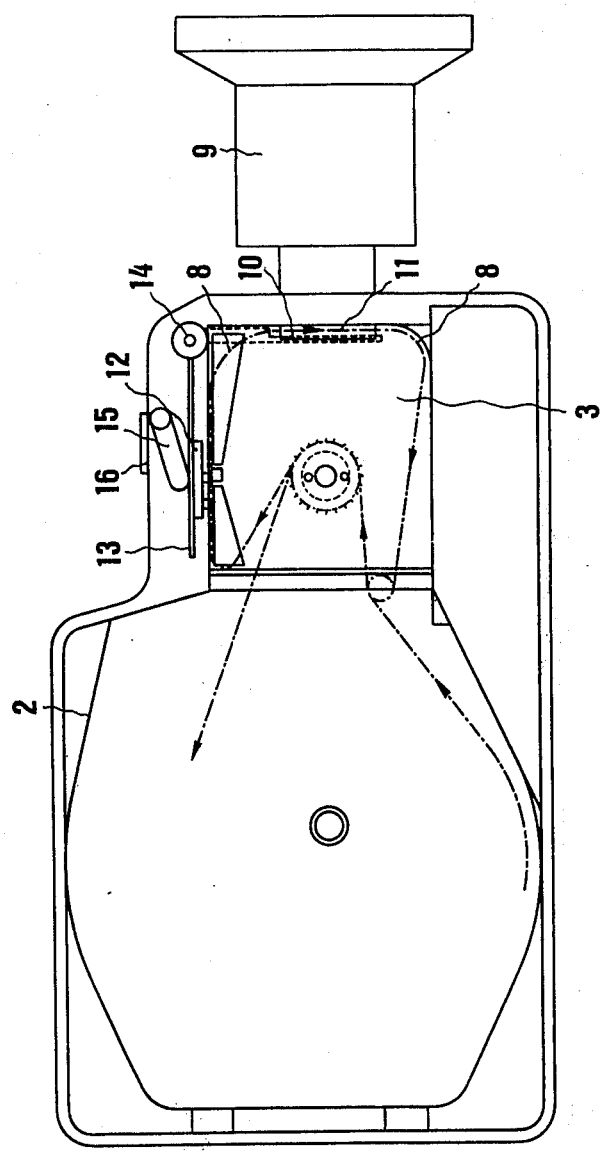
Figure 4:
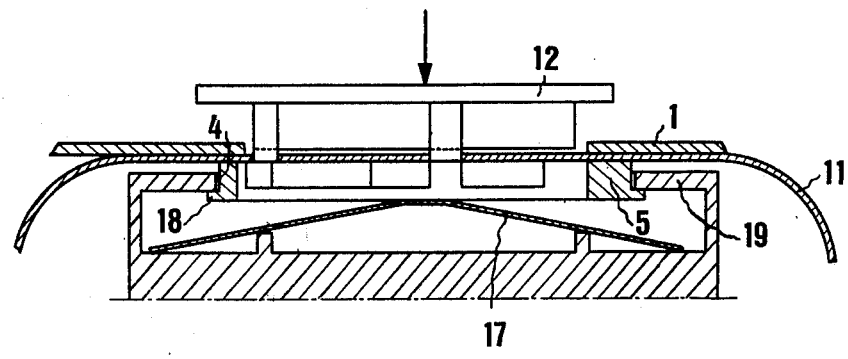
Figure 5:
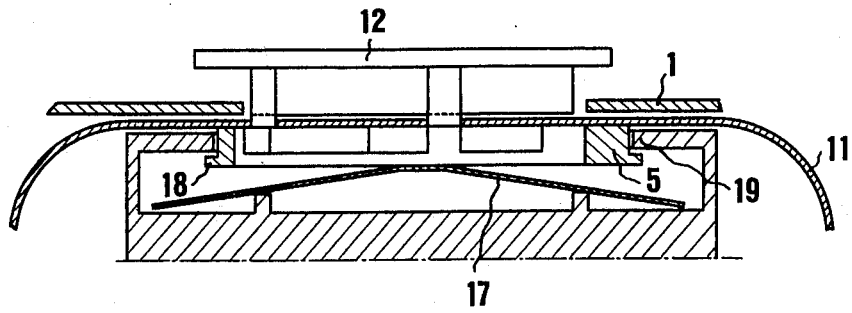

FIG. 3 an identical view to that of FIG. 2 after fitting the loading clip and operating the device for rendering inoperative the pressure pad incorporated in the loading clip, and FIGS. 4 and 5 larger scale sectional views of the device for rendering inoperative the pressure pad incorporated in the loading clip and the adjacent portion of the clip respectively before and after operating the said device.

A camera according to the invention is designed to use an elongated, large capacity loading clip 1 having a film storage container 2 and a substantially parallelepipedic end 3 which is the film passage area. End 3 has a lateral gate 4 equipped with a pressure pad 5 (FIGS. 4 and 5) for the light printing of the film and a terminal gate 6 with an opening 7 for the passage of a magnetic recording head. The loading clip described hereinbefore is designed to permit the simultaneous sound recording and shooting, whereby lateral gate 4 is located in the extension of the lens. A sound recording is performed by a continuous movement of the sound track carried by the film, whilst shooting is performed by the abrupt advancement of the film, the film having in end 3 two absorption loops 8 (FIG. 3) for the said abrupt movement.

In the camera according to the invention the lens 7 is arranged in the extension of loading clip 1 facing gate 6, hence it is the latter which is used for shooting purposes. To this end, the camera has a pressure pad 10 (FIGS. 2 and 3) pressing the film against a shooting gate (not shown) and an advancement member for film 11.

The camera according to the invention has a shoe 12 integral with a lever 13 articulated on a spindle 14. Lever 13 is operated via a push button 15 which is itself operated by a push button 16 on the outside of the camera via a torsion spring (not shown). Pressure pad 10 rotates with lever 13 in such a way that the operation of push button 16 simultaneously brings shoe 12 and pressure pad 10 into the active position.

With reference to FIGS. 4 and 5, pressure pad 5 incorporated in loading clip 1 presses film 11 against the edge of the clip under the action of a spring plate 7, whereby a shoulder 18 of pressure pad 5 co-operates with edge 19 of gate 4 of clip 1. After moving shoe 12 (FIG. 5) pressure pad 5 moves toward the inside of clip 1 and film 11 is no longer locked between pressure pad 5 and the wall of clip 1.

Therefore, gate 4 can be used for example for the automatic stopping of the camera when the film runs out or for mounting an exposure counter or for making the film for identifying shooting programmes or for other purposes.

What I claim is:

1. A silent camera for use with a film cartridge of the type having a cartridge aperture for exposing film with a movable cartridge film pressure pad adjacent thereto to bias the film toward said cartridge aperture and a cartridge recess spaced from said cartridge aperture across which the film passes, said camera comprising a body having a camera aperture for exposing film, said body being adapted to receive said cartridge with said cartridge recess positioned adjacent to and inwardly of said camera aperture, a lens mounted on said body adjacent and outwardly of said camera aperture, a movable camera film pressure pad adjacent to and inwardly of said camera aperture so positioned as to extend into said cartridge recess to be engagable with said film to bias said film toward said camera aperture when a cartridge is placed in said body, means engagable with said film cartridge pressure pad when a cartridge is placed in said body to move said film cartridge pressure pad away from said cartridge aperture, whereby said camera film pressure pad can bias said film toward said camera aperture and said cartridge film pressure pad can be held away from said film.

2. The structure of claim 1 wherein said camera film pressure pad and said means engagable with said cartridge film pressure pad are interconnected by lever means so that said cartridge film pressure pad is held away from said film when said camera film pressure pad is biasing said film toward said camera aperture.

3. The structure of claim 2 wherein said lever means comprises a lever pivotally mounted inside said camera body, said camera pressure pad being connected to one end of said lever and said means for moving said cartridge pad being connected to the other end of said lever, and actuating means on the outside of said camera body and extending into said camera body and engagable with said lever to pivot said lever.

* * * * *